United States Patent [19]

Katahara

[11] Patent Number: 5,069,307
[45] Date of Patent: Dec. 3, 1991

[54] ACOUSTIC SIGNAL TRANSMITTER FOR LOGGING TOOLS

[75] Inventor: Keith W. Katahara, Allen, Tex.

[73] Assignee: Atlantic Richfield Company, Los Angeles, Calif.

[21] Appl. No.: 319,607

[22] Filed: Mar. 6, 1989

[51] Int. Cl.⁵ .............................................. G01V 1/40
[52] U.S. Cl. ..................................... 181/105; 181/106; 181/113; 367/174; 367/912
[58] Field of Search ................. 367/912, 25, 140, 157, 367/174; 181/105, 106, 113

[56] References Cited

U.S. PATENT DOCUMENTS

| | | | |
|---|---|---|---|
| 4,649,525 | 3/1987 | Angona et al. | 181/106 |
| 4,869,349 | 9/1989 | Minear et al. | 181/102 |
| 4,894,811 | 1/1990 | Porzio | 367/174 |

Primary Examiner—Deborah L. Kyle
Assistant Examiner—J. Woodrow Eldred
Attorney, Agent, or Firm—Michael E. Martin

[57] ABSTRACT

An acoustic signal transmitter for well logging tools and the like comprising a housing having a generally rectangular opening formed therein and defining a fluid filled cavity in which a compliant sheet transmitter member is disposed and is provided in a relaxed condition with a curvature. Opposite ends of the transmitter member are connected to piezoelectric actuators which are responsive to an electrical signal to elongate to stretch the sheet into a generally planar state to generate a pressure pulse in the cavity for transmission through a fluid filled borehole to a formation for, preferably, measuring the shear wave velocity in the formation material.

15 Claims, 2 Drawing Sheets

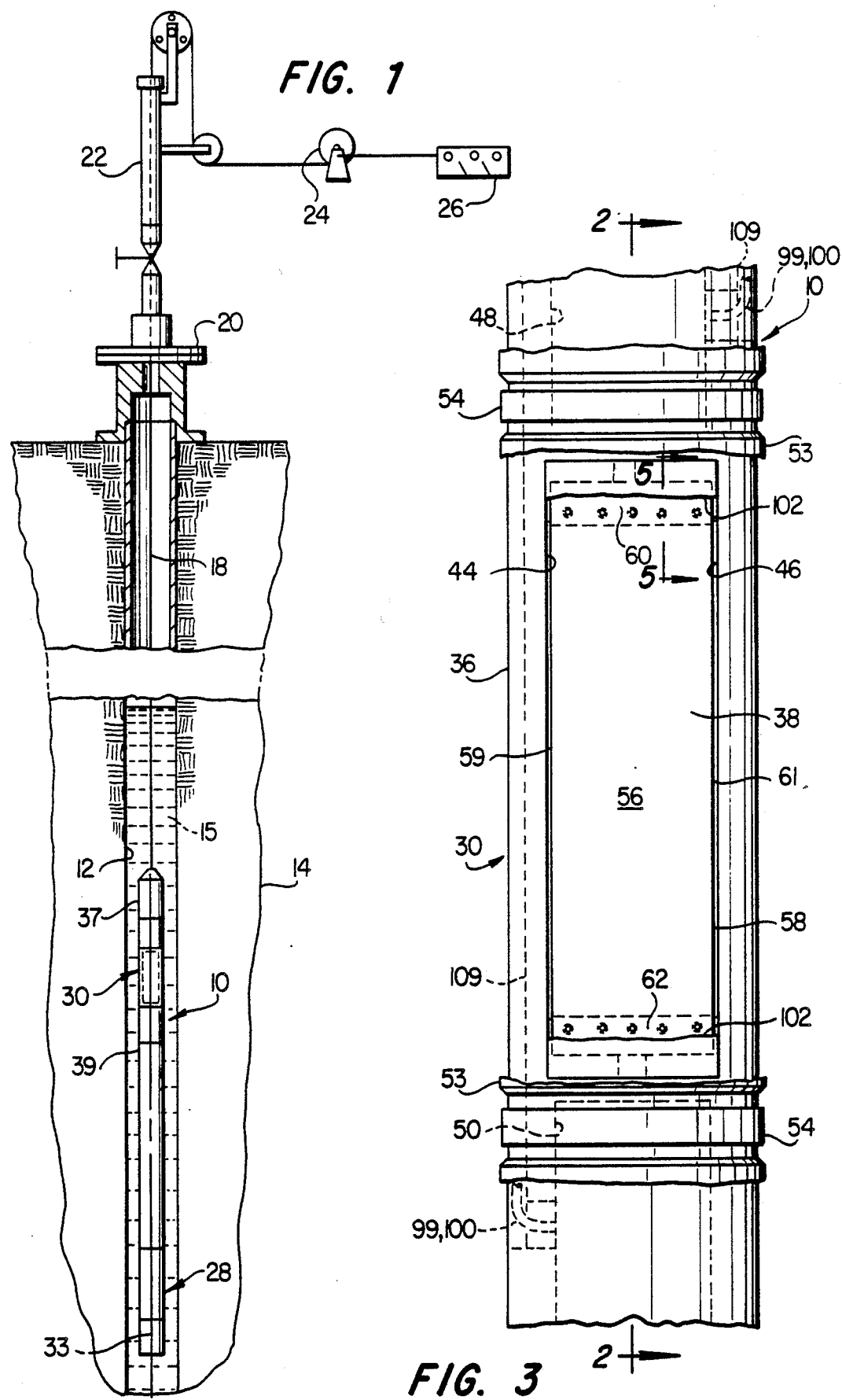

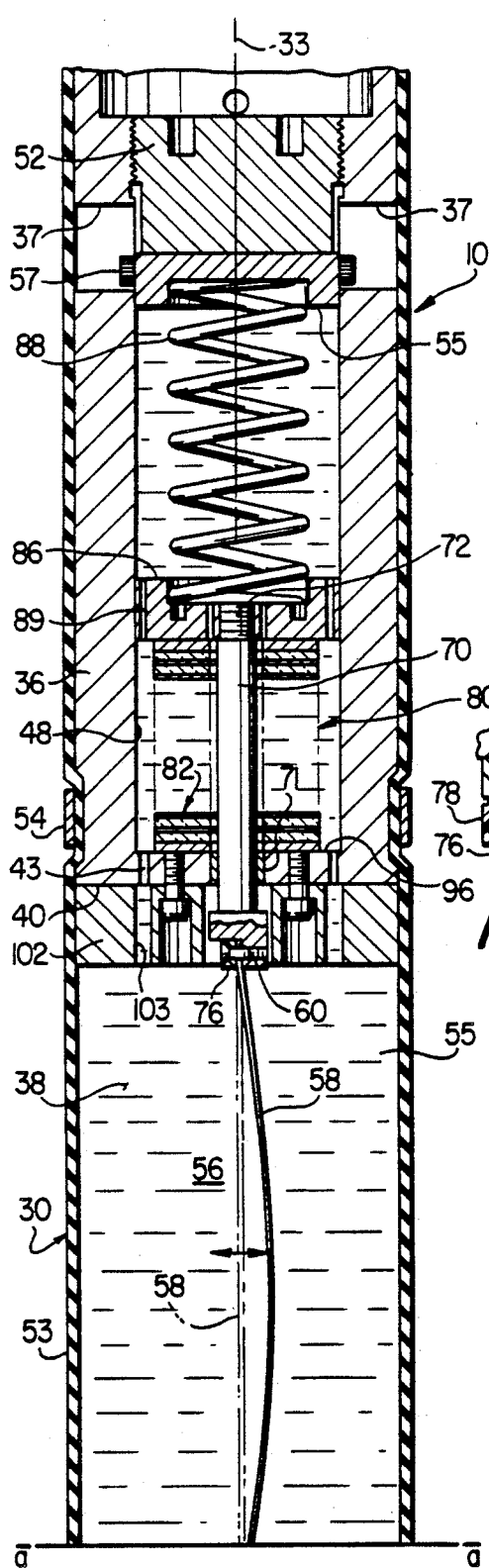
FIG. 2A
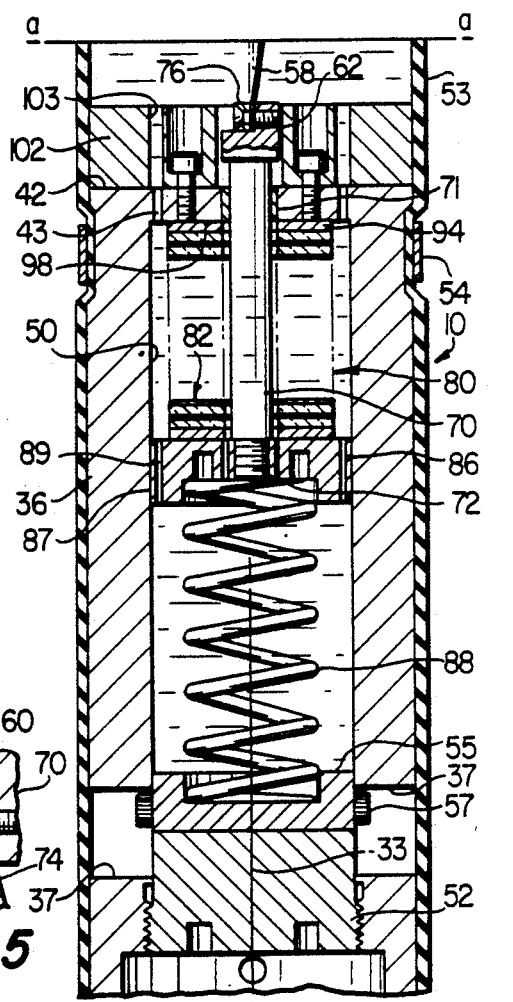
FIG. 5
FIG. 2B
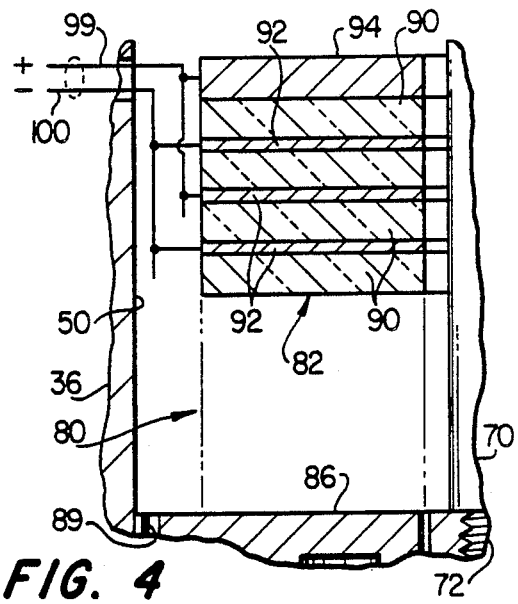
FIG. 4

ACOUSTIC SIGNAL TRANSMITTER FOR LOGGING TOOLS

BACKGROUND OF THE INVENTION

1. Field of the Invention

The present invention pertains to an acoustic signal transmitter for logging tools characterized by a deflectable plate member which generates a pressure pulse in a liquid filled cavity which may be coupled to the formations surrounding a wellbore. The plate member is actuated by a piezoelectric actuator member.

2. Background

Certain types of acoustic well logging tools have been developed for generating so-called shear waves and compressional waves for transmission through an earth formation from fluid filled boreholes for determining certain formation characteristics in the vicinity of the borehole. Although various types of transmitters or acoustic wave generators have been developed, a continuing problem in the art of acoustic well logging tools is the development of a transmitter which is capable of operating over a suitable frequency range and also capable of imparting sufficient energy into the formation to provide acceptable signal transmission. Since it is desirable to continuously move the logging tool through the borehole during the signal generating process, the transmitter or transducer must be capable of imparting sufficient energy through the borehole fluid to and from the formation to provide an adequate return signal to the receiving elements of the tool.

Several efforts have been made to develop tools which utilize piezoelectric elements as the signal generator or transmitter. U.S. Pat. Nos. 3,593,255 to J. E. White; 4,319,345 to J. R. Dennis; 4,649,525 to F. A. Angona et al; 4,649,526 to Winbow et al; 4,715,019 to Medlin et al; 4,718,046 to Medlin; British Patent Application 2,122,351 to Exxon Production Research Company; British Patent Application 2,124,377 to Exxon Production Research Company and European Patent Publication No. 0246773 to Mobil Oil Corporation all disclose various logging tool transmitters which utilize piezoelectric signal transmitting elements. However, one shortcoming of all of the devices disclosed in the above references is that the piezoelectric members themselves are used as the primary signal transmitting or generating member. Since piezoelectric ceramic materials, in particular, have relatively small elongation or strain characteristics they do not couple acoustic energy into wellbore fluids as well as is often desired. Relatively complex piezoelectric structures are thus utilized to provide suitable mechanical advantage such as described in U.S. Pat. Nos. 4,649,525 and 4,715,019.

Accordingly there has been a long-felt need to provide an acoustic signal transmitter, particularly adapted for the dimensional constraints of wellbores, for operation in the environment of deep or shallow wellbores and which is capable of generating sufficient mechanical advantage and displacement to transmit pulse type acoustic signals through a borehole fluid for propagation through an earth formation surrounding a wellbore wherein adequate signals are transmitted back to receiver elements associated with a logging tool and the like. Such a transmitting element should have a relatively evenly distributed mechanical advantage in order to produce an asymmetric acoustic wave or pulse within the space constraints of wellbores and tools which may be inserted therein, be reliable in operation and be mechanically uncomplicated.

SUMMARY OF THE INVENTION

The present invention provides a unique acoustic signal generating or transmitting apparatus particularly adapted for use in conjunction with logging tools for determining certain characteristics of subterranean formations, which are desirable to know in the oil and gas exploration and production industry.

In accordance with one important aspect of the present invention there is provided an acoustic signal transmitter wherein an actuator is responsive to an electrical pulse type signal to undergo a relatively minor degree of mechanical displacement and wherein a compliant, deflectable sheet or plate member is connected to the actuator and is adapted to undergo a mechanically advantaged displacement with respect to the actuator to provide an acoustic pulse wave of dipole symmetry which may be transmitted through borehole fluid to the surrounding earth formation. A piezoelectric element in the form of a stack of relatively thin wafers of piezoelectric material is coupled to an actuating rod which, in turn, is connected to the plate member which is preferably arranged in a predetermined curved position in its relaxed state and is tensioned to displace fluid in a cavity within the transmitter housing.

In accordance with another important aspect of the invention, an acoustic signal transmitter is provided wherein the transmitter actuator is conveniently spaced from and does not interfere with the displacement of fluid in the tool cavity which is created by the transmitter fluid displacing member itself. The fluid displacing member is preferably arranged to have an initial radius of curvature in a relaxed condition of the transmitter and to sweep a volume of fluid in the transmitter cavity, upon actuation, which is many times the volume change which can be accomplished by the actuator for the fluid displacing member.

In accordance with another aspect of the present invention, an acoustic signal transmitter is provided utilizing an element or group of elements of piezoelectric material comprising an actuator which displaces a mechanical member to create a fluid pressure pulse within a borehole and wherein the actuator is preloaded by a spring member to reduce hysteresis and prevent excessive tension in the piezoelectric material. The piezoelectric actuator is preferably driven with a pulse type signal with a very fast voltage rise time to the maximum voltage of the pulse and with a slow voltage decay to permit proportionately slow contraction of the piezoelectric actuator to its initial length and by return of the sheet or plate member to an initial radius of curvature while minimizing the chance of the sheet or plate member undergoing rippling or twanging.

The present invention still further provides an acoustic signal transmitter which has a relatively broad frequency band of operation, is particularly advantageous for fitting within the envelope required for tools which may be inserted into oil and gas wells, and which may be modified to provide signal amplitude and frequency ranges well within the desired ranges for wellbore logging operations.

The above-described advantages and features of the present invention together with other superior aspects thereof will be further appreciated by those skilled in the art upon reading the detailed description which follows in conjunction with the drawing.

BRIEF DESCRIPTION OF THE DRAWING

FIG. 1 is a vertical section view in somewhat schematic form of a well being logged with a tool in accordance with the present invention;

FIGS. 2A and 2B when joined at line a—a comprise a vertical longitudinal central section view taken generally along the line 2—2 of FIG. 3;

FIG. 3 is an elevation of a well logging tool showing a portion of the acoustic signal transmitter of the present invention;

FIG. 4 is a detail section view of a portion of one of the piezoelectric transmitter actuators; and FIG. 5 is a detail section view taken along the line 5—5 of FIG. 3.

DESCRIPTION OF A PREFERRED EMBODIMENT

In the description which follows, like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Referring to FIG. 1, there is illustrated a somewhat schematic view of a logging tool 10 disposed in a wellbore 12 penetrating an earth formation 14. The wellbore 12 is at least partially filled with a liquid 15 in which the logging tool 10 is submerged and suspended within the well by an elongated support and signal transmitting cable 18, sometimes known as a wireline. The wireline 18 extends through a conventional well head 20, a lubricator apparatus 22 and is trained over a storage drum 24. The wireline 18 is suitably electrically connected to a control module 26 which may be used to control the operation of and record data from the logging tool 10.

The logging tool 10 is provided with spaced apart signal receiving means 28 and signal transmitting means 30. The signal receiving means may comprise a plurality of signal receiving elements, not shown, which are responsive to acoustic waves which have been transmitted from the formation 14 back through the fluid 15 toward the tool 10 to record the amplitude and frequency thereof. The receiving elements may be similar to those described in the aforementioned patents or may be of other types which are known to those skilled in the art. The orientation of the receiving elements for receiving signals being transmitted through the formation and the wellbore fluid 15 is desirably related to the orientation of the transmitting means 30 with respect to the longitudinal central axis 33 of the tool 10. The particular arrangement of the transmitting means 30 described herein is adapted for generating an asymmetric dipole pressure pulse in the fluid filled wellbore which is transmitted into the formation 14 and results in a pulse type signal which reenters the wellbore in the vicinity of the receiving means 28 for detection thereby. Those skilled in the art will recognize that the particular signal transmitting device described hereinbelow may be arranged in such a way as to provide for generating compressional on the omnidirectional pressure pulses or waves also.

Referring now to FIGS. 2A, 2B and 3, in particular, the tool 10 includes an elongated generally cylindrical body member 36 having a generally rectangular opening 38 formed therein and delimited by opposed transverse surfaces 40 and 42, FIGS. 2A and 2B, and longitudinally extending parallel surfaces 44 and 46, FIG. 3. Longitudinally extending central bore portions 48 and 50 extend within the housing member 36 on opposite sides of the opening 38 and are closed at one end, respectively, by removable plug members 52 threadedly engaged with the housing member 36. The housing member 36 is suitably connected to further housing portions 37 and 39, see FIG. 1, of the tool 10 by suitable means, not shown.

The opening 38 is preferably covered by a flexible elastomeric sleeve 53 which is suitably secured to the housing member 36 including on opposite sides of the opening by suitable band clamps 54. A cavity 56 is thus defined by the opening 38 and the sleeve 53 which is preferably filled with a suitable liquid 55. The cavity 56 is also occupied by a compliant acoustic signal transmitting member generally designated by the numeral 58 in the form of a thin, flexible metal sheet or plate. Opposite ends 60 and 62 of the sheet 58 are secured to respective actuating rod members 70 which are guided for reciprocating movement by sleeve bearings 71 supported on the body 36. The rod members 70 each have a threaded distal end 72 opposite the end to which the signal transmitting member 58 is attached. Referring to FIG. 5, and by way of example, a transverse clamping surface 74 is formed on each of the rod members 70 and the plate ends 60 and 62 are clamped to the respective surfaces 74 of the rod members by removable clamp plates 76 which are secured in clamping position by threaded fasteners 78. The surface 74 and a cooperating clamping surface 77 of the clamp plate 76 are formed to slope with respect to the axis 33 or have a radius or curvature similar to the radius of curvature of the sheet member 58 in its relaxed position as illustrated in FIG. 2. Accordingly, the sheet member 58 is typically biased to assume a curved position when the actuating rods 70 are not exerting tension on the member 58.

As shown in FIG. 3, the side edges 59 and 61 of the member 58 are preferably generally parallel to the surfaces 44 and 46, respectively, and the member 58 is dimensioned such that these side surfaces 59 and 61 are spaced closely adjacent to the surfaces 44 and 46. In this way when the member 58 is flexed or placed in tension sufficiently to cause the member to become more nearly planar, as shown by the alternate position in FIGS. 2A and 2B, very little fluid in the cavity 56 is allowed to escape from one side of the member to the other through the spaces between the edges 59 and 61 and the respective side surfaces 44 and 46.

The actuating rods 70 form part of opposed piezoelectric actuators, each generally designated by the numeral 80. The actuators 80 are substantially identical in construction and operation and are characterized by a stack 82 of generally cylindrical disk or ring shaped piezoelectric ceramic members which are suitably electrically connected to respond to an electrical potential imposed across each disk member in the stack to elongate in the direction of the axis 33. Each of the actuators 80 is further characterized by an end plate 86 threadedly coupled to the rod 70 and engaged with a coil spring 88 trapped in the bores 48 and 50 between the end plates and the head members 52, respectively. Spring retainer plates 55 are interposed between the springs 83 and the head members 52. The retainer plates 55 are preferably precluded from rotation in the bores 48 and 50 by projections 57 disposed in slots 37 formed in the housing 36.

Referring briefly to FIG. 4, each of the piezoelectric stacks 82 is made up of a plurality of disk members 90 of piezoelectric ceramic material, which disk members are bonded on their opposite surfaces to a copper conductor disk 92. The end of the stack 82 opposite the plate member 86 is provided with a steel end disk member 94 as a support for supporting the stack in engagement with an end face 96 of the cavity formed by the bore 48 and a corresponding end face 98 of a cavity formed by the bore 50, see FIG. 2. As shown in FIG. 4, alternate ones of the copper disk members 92 are connected to a common conductor 99 and alternate ones of the copper disk members 92 are also connected to another conductor 100. An electrical potential may be imposed across each one of the disk members 90 to cause the disk members to elongate in the direction of the axis 33 to effect longitudinal movement of the rod 70 to displace the signal transmitting sheet or plate member 58 as described above.

Each of the plate members 86 is journaled for close fitting sliding engagement with the wall defining the bores 48 and 50 and the peripheral surfaces 87 of the plate member 86 may be coated with a bearing material such as a fluorocarbon plastic. The bores 48 and 50 may be formed by hardened and ground steel to form a compatible bearing surface. Longitudinal passages 89 extend through the plate members 86 to allow fluid to circulate freely on opposite sides of the plate members during movement thereof. As shown in FIGS. 2A and 2B, spacer members 102 are secured to the respective surfaces 40 and 42 to fill in the space adjacent the clamp ends of the rods 70 to enhance the displacement of fluid in the cavity 56 in the direction of intended imposition of a pressure pulse or wave form. Passages 103 and 43 are formed in the spacers 102 and the housing member 36, respectively, to allow fluid to circulate between the cavity 56 and the cavity portions formed by the bores 48 and 50 to minimize pressure differentials caused by movement of the actuators 80.

The operation of the acoustic signal transmitting means 30 is believed to be apparent from the foregoing description of its structural details. A pulsed electrical potential signal having a very steep rise time and a gradual decay time is imposed on the actuators 80 from a source, not shown. The conductors 99 and 100 may be suitably insulated, bundled and trained along the housing member 36 in suitable grooves 109, as shown in FIG. 3, and which are formed along opposite sides of the housing member. The conductors 99 and 100 lead to suitable control means, not shown, disposed in the section 37 of the tool 10 or at the surface and associated with the control module 26. The polarity of the pulse type electrical signal imposed on the actuators 80 is unidirectional to avoid depolarization of the disks 90. The preferred material for the piezoelectric disks 90 may be lead-zirconate-titanate (PZT) ceramic. This particular type of ceramic exhibits relatively little change in volume when excited electrically and axial extension in the direction of the axis 33 is accompanied by lateral contraction to minimize net change in volume of the stacks 82. Accordingly, the cavities in which the actuators 80 are disposed are not likely to experience much of a change in the pressure of the fluid occupying these cavities and the provision of the passages 103, 43 and 89 allow free circulation of fluid to minimize any rapid pressure rises from trapped quantities of fluid.

Another advantage of the present invention is the provision of the biasing springs 88 acting against the actuator stacks 82 which reduces hysteresis in the operation of the actuators 80 and also minimizes the likelihood of excessive tension which might fracture the disks 90 in response to electrical stimulation. By providing a voltage signal which has a fast rise time and a relatively slow decay time the contraction of the actuator stacks 82 is relatively slow and the member 58 is allowed to return to its initial curvature more easily. The transmitted pressure pulse is thus one of steep rise or a spiked pulse of short duration without appreciable oscillation following the initial spike. The pressure excursion is positive on one side of the member 58 and negative on the other side, thereby forming a dipole radiation pattern.

The thickness of the sheet member 58 should be only that sufficient to minimize rippling and prevent structural failure. An objective is to minimize the inertia and stiffness of the member 58 as much as possible and as such it cannot be used in compression without buckling. However, this provides the advantage that in the frequencies of interest, resonant frequencies of the member 58 are avoided. Since the propagation of direct shear waves in a wellbore generally below ten kHz are desired, the actuators 80 should have a fundamental resonance frequency above about ten kHz. Within these limits the frequency response of the transmitter 30 is very broad. Moreover, the volume of the stacks 82 can be made large enough to provide very high amplitude dipolar pulses.

The use of a high compliance sheet or plate-like member 58 to drive the fluid in the cavity 56 and coupling this drive to the fluid in the wellbore provides a relatively large mechanical amplification of the displacement of the actuators 80. The initial curvature of the member 58 may be selected by the length of the member between the rods 70. Although two actuators 80 are utilized in the preferred embodiment of the transmitter means 30, those skilled in the art will recognize that the member 58 may be secured at one end in a fixed position relative to the housing member 36 and energized by only one of the actuators 80. Moreover, those skilled in the art will recognize that the signal transmitting means may be arranged in such a way that more than one combination of actuator 80 and transmitter member 58 can be provided in a mirror image configuration or in other selected arrays.

By way of example, the member 58 may be formed of steel sheet having a length of about six inches, a width of about two inches and a sheet thickness in the range of about 0.02 inches to 0.05 inches. The actuator stacks 82 may be about 1.25 inches in diameter and 2.0 inches long and, should each produce a displacement along the axis 33 of about 0.001 inches. With the above-mentioned dimensions of the member 58 and an initial radius of curvature of about 6.0 feet, this member will sweep out a volume of about 0.04 cubic inches for the given stack displacement. The volume change swept by the transverse faces of the stacks 82 themselves with the above mentioned dimensions would, by comparison, be only 0.005 cubic inches. The unique arrangement of the sheet transmitter member 58 and the actuators 80 provides for displacement of fluid in a direction normal to the axis 33 for a relatively small displacement of the actuators 80 to elongate in a direction parallel to the axis. The fluid filling the cavity 56 should be a relatively low viscosity electrically insulating type fluid such as a fluid manufactured under the trademark UNIVIS by EXXON Corporation. Silicone type fluids and fluids used in transformer and heat transfer applications may also be used. The sleeve 53 should, of course, be of a relatively compliant material to couple the acoustic energy between the fluid in the cavity 56 and the fluid in the borehole. Nitrile rubber is adequate for most applications contemplated by logging tools. The sleeve 53 also advantageously provides for equalization of hydrostatic pressure between the borehole fluid and the cavity 56.

Although a preferred embodiment of the present invention has been described in detail herein, those skilled in the art will recognize that various substitutions and modifications may be made to the invention without departing from the scope and spirit thereof as recited in the appended claims.

What is claimed is:

1. An acoustic signal transmitter for a logging tool for imparting a pressure pulse in a fluid filled bore hole, said transmitter comprising:
   housing means including a portion defining a fluid filled cavity;
   a flexible transmitter member disposed in said cavity and characterized by a relatively thin planar sheet operable to be disposed in a curved position; and
   actuator means supported on said housing means and connected to said sheet and responsive to an electrical signal for causing said sheet to change its curvature to displace fluid in said cavity to generate an asymmetric pressure pulse for transmission through said borehole to a formation into which said borehole penetrates.

2. The transmitter set forth in claim 1 wherein:
   said actuator means includes a member clamped to one end of said sheet and operably connected to means responsive to said electric signal to move said transmitter member to change said curvature.

3. The transmitter set forth in claim 2 wherein:
   said actuator member includes means for clamping one end of said transmitter member to said actuator means and having cooperating surface means for biasing said transmitter member in said curved position.

4. The transmitter set forth in claim 1 wherein:
   said actuator means comprises a member formed of piezoelectric material, conductor means connected to said member formed of piezoelectric material and adapted to be connected to an electrical potential source for causing a dimensional change in said member formed of piezoelectric material to effect movement of said transmitter member.

5. The transmitter set forth in claim 4 wherein:
   said member formed of piezoelectric material comprises a stack of plural disks formed of piezoelectric material, each of said disks being connected for receiving an electrical potential signal to cause elongation of said disks in a direction corresponding to the central axis of said disks and a member connected to said transmitter member and responsive to the elongation of said disks for causing said transmitter member to change its curvature.

6. The transmitter set forth in claim 1 including:
   means for biasing said actuator means to urge said transmitter member into said curved position.

7. The transmitter set forth in claim 1 wherein:
   said transmitter includes actuator means connected to opposed ends of said transmitter member and responsive to an electrical signal to exert a force on said transmitter member in opposite directions along an axis to effect a change in curvature of said transmitter member.

8. The transmitter set forth in claim 1 wherein:
   said housing means includes a housing member having a central longitudinal axis and said means forming said cavity defines a generally rectangular shape of said cavity in a plane parallel to said axis, said transmitter member comprises a generally rectangular sheet disposed in said cavity and having dimensions only slightly less than the dimensions of said cavity defining said rectangular shape for displacing fluid within said cavity to cause a unidirectional pressure pulse to be created for transmission through said borehole to said formation.

9. An acoustic signal transmitting apparatus for a well logging tool for generating asymmetric pressure pulses in a fluid filled borehole to propagate shear waves through a formation penetrated by said borehole, said apparatus comprising:
   an elongated generally cylindrical housing member including a cavity defined by an opening in said housing member;
   a generally compliant elastomeric sleeve disposed on said housing member and over said opening to isolate said cavity from fluids in said borehole;
   a quantity of hydraulic fluid disposed in said cavity;
   an acoustic signal transmitter member disposed in said cavity and comprising a generally flexible sheet having opposite end portions anchored to means disposed in said housing member, said transmitter member having in one condition a first degree of curvature and in an actuated condition, a second degree of curvature less than said first degree of curvature for displacing fluid within said cavity to generate an asymmetric pressure pulse for transmission from said cavity through said sleeve for coupling to fluid in said borehole; and
   piezoelectric actuator means connected to at least one end of said transmitter member and disposed in cavity means formed in said housing, said actuator means including an actuator member operably connected to said transmitter member and responsive to elongation of said stack to change the curvature of said transmitter member.

10. The apparatus set forth in claim 9 wherein:
    said actuator means comprises a stack of generally cylindrical disk members of piezoelectric material electrically connected to be responsive to an electrical signal to elongate in an axial direction with respect to said housing member.

11. The apparatus set forth in claim 10 including:
    means for urging said transmitter member to said one condition.

12. The apparatus set forth in claim 11 wherein:
    said means for urging comprises spring means engaged with said stack of said disk members.

13. The apparatus set forth in claim 9 wherein:
    said transmitter member is disposed in said housing for displacing fluid in said cavity in a direction generally normal to the direction of elongation of said stack.

14. The apparatus set forth in claim 13 wherein:
    said transmitter member comprises a generally rectangular thin metal sheet movable between said one condition and said actuated condition for displacing said fluid.

15. A signal transmitting apparatus for generating a pressure wave in a fluid filled space comprising:
    a housing member including a cavity defined by an opening in said housing member;

a fluid disposed in said cavity;

a transmitter member disposed in said cavity and comprising a generally flexible sheet having opposite end portions anchored to means disposed in said housing member, said transmitter member having in a first condition a first curvature and in a second condition being moved toward a planar position for displacing fluid within said cavity to generate an asymmetric pressure pulse for transmission from said cavity; and piezoelectric actuator means connected to said transmitter member, said piezoelectric actuator means including an actuator rod operably connected to said transmitter member and responsive to energization of said actuator means to move said transmitter member between said first condition and said second condition, the movement of said actuator rod being generally normal to the movement of said transmitter member.

* * * * *